US008990686B2

(12) United States Patent
Lin et al.

(10) Patent No.: US 8,990,686 B2
(45) Date of Patent: Mar. 24, 2015

(54) VISUAL NAVIGATION OF DOCUMENTS BY OBJECT

(75) Inventors: Amy Lin, Redmond, WA (US); Gabhan Berry, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 13/287,754

(22) Filed: Nov. 2, 2011

(65) Prior Publication Data

US 2013/0111319 A1  May 2, 2013

(51) Int. Cl.
| | | |
|---|---|---|
| G06F 17/00 | (2006.01) | |
| G06F 3/0488 | (2013.01) | |
| G06F 3/0486 | (2013.01) | |

(52) U.S. Cl.
CPC ............ *G06F 3/0488* (2013.01); *G06F 3/0486* (2013.01)
USPC .......................................... 715/273; 715/200

(58) Field of Classification Search
USPC .......................................... 715/200, 273, 212
See application file for complete search history.

(56) References Cited

U.S. PATENT DOCUMENTS

| | | | |
|---|---|---|---|
| 5,784,545 A | | 7/1998 | Anderson et al. |
| 6,185,582 B1 | | 2/2001 | Zellweger et al. |
| 6,271,845 B1 * | | 8/2001 | Richardson .................... 715/764 |
| 6,282,547 B1 | | 8/2001 | Hirsch |
| 6,801,910 B1 * | | 10/2004 | Bedell et al. ............................ 1/1 |
| 7,082,568 B2 * | | 7/2006 | Iwamoto et al. .............. 715/212 |
| 7,590,997 B2 * | | 9/2009 | Diaz Perez .................... 725/109 |
| 7,617,444 B2 | | 11/2009 | Rothschillwe et al. |
| 7,890,533 B2 | | 2/2011 | Pollara |
| 7,921,363 B1 * | | 4/2011 | Hao et al. ...................... 715/273 |
| 7,941,742 B1 * | | 5/2011 | Hao et al. ...................... 715/215 |
| 7,962,443 B2 * | | 6/2011 | Krinsky ........................ 707/602 |
| 8,001,115 B2 * | | 8/2011 | Davis et al. ................... 707/723 |
| 8,448,221 B2 * | | 5/2013 | Pearcy et al. ..................... 726/1 |
| 8,566,422 B2 * | | 10/2013 | Johnson et al. ............... 709/218 |

(Continued)

FOREIGN PATENT DOCUMENTS

| | | |
|---|---|---|
| CN | 101568923 A | 10/2009 |
| WO | 2009/142624 A1 | 11/2009 |

OTHER PUBLICATIONS

Devillers et al., Multidimensional Management of Geospatial Data Quallity Information for its Dynamic Use within GIS, Google 2005, pp. 205-215.*
Jern, Collaborative Visual Data Navigation on the Web, IEEE 2000, pp. 268-273.*
Chen, QuickTimeVR—An Image-Based Approach to Virtual Environment Navigation, ACM 1995, pp. 29-38.*

(Continued)

*Primary Examiner* — Cong-Lac Huynh
(74) *Attorney, Agent, or Firm* — Damon Rieth; Jim Ross; Micky Minhas

(57) ABSTRACT

A navigable view of objects (e.g. charts, tables, graphs, data sources, individual sheets of a workbook, . . .) that are obtained from one or more electronic object sources are displayed as graphical objects. The objects may be automatically/manually organized within the navigable display (e.g. by type, by sheet, by relationship, by data source, . . .). A user may navigate through the displayed objects. For example, a user may zoom in on an object to see a full screen version of the object. When zoomed in on an object, the navigable display may be panned (e.g. left, right, up or down) to see adjacent objects. From one object, the user may explore related elements using the same shared data (e.g. exploring a table object also shows a data source element). A user may also perform supported operations on the objects (e.g. sort/filter/drill down/drill up) that affect a display of the related objects.

19 Claims, 15 Drawing Sheets

(56) References Cited

U.S. PATENT DOCUMENTS

| | | | |
|---|---|---|---|
| 8,589,783 B2* | 11/2013 | Williamson | 715/212 |
| 8,601,361 B2* | 12/2013 | Berger et al. | 715/227 |
| 2004/0155888 A1* | 8/2004 | Padgitt et al. | 345/619 |
| 2006/0224946 A1* | 10/2006 | Barrett et al. | 715/503 |
| 2007/0022128 A1 | 1/2007 | Rothschiller et al. | |
| 2007/0171473 A1 | 7/2007 | Iwasaki | |
| 2007/0220415 A1* | 9/2007 | Cheng et al. | 715/503 |
| 2009/0235152 A1 | 9/2009 | Rampson | |
| 2009/0240725 A1* | 9/2009 | Curtis et al. | 707/103 R |
| 2010/0321407 A1 | 12/2010 | Mital et al. | |
| 2011/0055682 A1 | 3/2011 | Friedrich | |
| 2011/0191246 A1* | 8/2011 | Brandstetter et al. | 705/59 |
| 2011/0316888 A1* | 12/2011 | Sachs et al. | 345/667 |
| 2012/0102396 A1* | 4/2012 | Arksey et al. | 715/273 |
| 2012/0120086 A1* | 5/2012 | Dang et al. | 345/589 |
| 2013/0007577 A1* | 1/2013 | Hammoud | 715/205 |
| 2013/0300747 A1* | 11/2013 | Wong et al. | 345/440.2 |

OTHER PUBLICATIONS

Yi et al., Toward a Deeper Understanding of the Role of Interaction in Information Visualization, IEEE 2007, pp. 1224-1231.*

Weaver, Building Highly-Coordinated Visualizations in Improvise, IEEE 2004, pp. 159-166.*

Roth et al., Visage: A User Interface Environment for Exploring Information, IEEE 1996, pp. 1-11.*

Syed, et al., "Exploiting a Web of Semantic Data for Interpreting Tables", In Proceedings of Second Web Science Conference, Apr. 26, 2010, 8 pages.

sqlserverdatamining.com; "Introducing the SQL Server 2005 Data Mining Add-ins for Office 2007", Retrieved on: Sep. 21, 2011, Available at: http://www.sqlserverdatamining.com/ssdm/Home/DataMiningAddinsLaunch/ tabid/69/Default.aspx.

International Search Report mailed Mar. 25, 2013, in PCT/US2012/063137.

"First Office Action and Search Report Issued In Chinese Patent Application No. 201210430980.X", Mailed Date: Jan. 7, 2015, 12 Pages.

* cited by examiner

VISUAL NAVIGATION OF DOCUMENTS BY OBJECT

BACKGROUND

Some documents, such as spreadsheets, may include multiple sheets including a large amount of data. Data in spreadsheets are often represented as objects such as tables and charts. These objects are often arranged in no particular order and may be placed throughout sheets. Locating data and objects in the spreadsheets can be difficult. For example, a user may need to search through all of the different spreadsheets to locate desired information, which can be laborious and time consuming.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A navigable view of objects (e.g. charts, tables, graphs, data sources, individual sheets of a workbook, . . .) that are obtained from one or more electronic object sources are displayed as graphical objects (e.g. thumbnails). The objects may be automatically/manually organized within the navigable display (e.g. by type, by sheet, by relationship, by data source, . . .). A user may navigate through the displayed objects using touch input and/or non-touch input. For example, a user may zoom in on an object to see a full screen version of the object. When zoomed in on an object, the navigable display may be panned (e.g. left, right, up or down) to see adjacent objects. From one object, the user may explore related elements using the same shared data (e.g. exploring a table object also shows a data source element). A user may also perform supported operations on the objects (e.g. sort/filter/drill down/drill up) that affect a display of the related objects.

DETAILED DESCRIPTION

Figure 1:
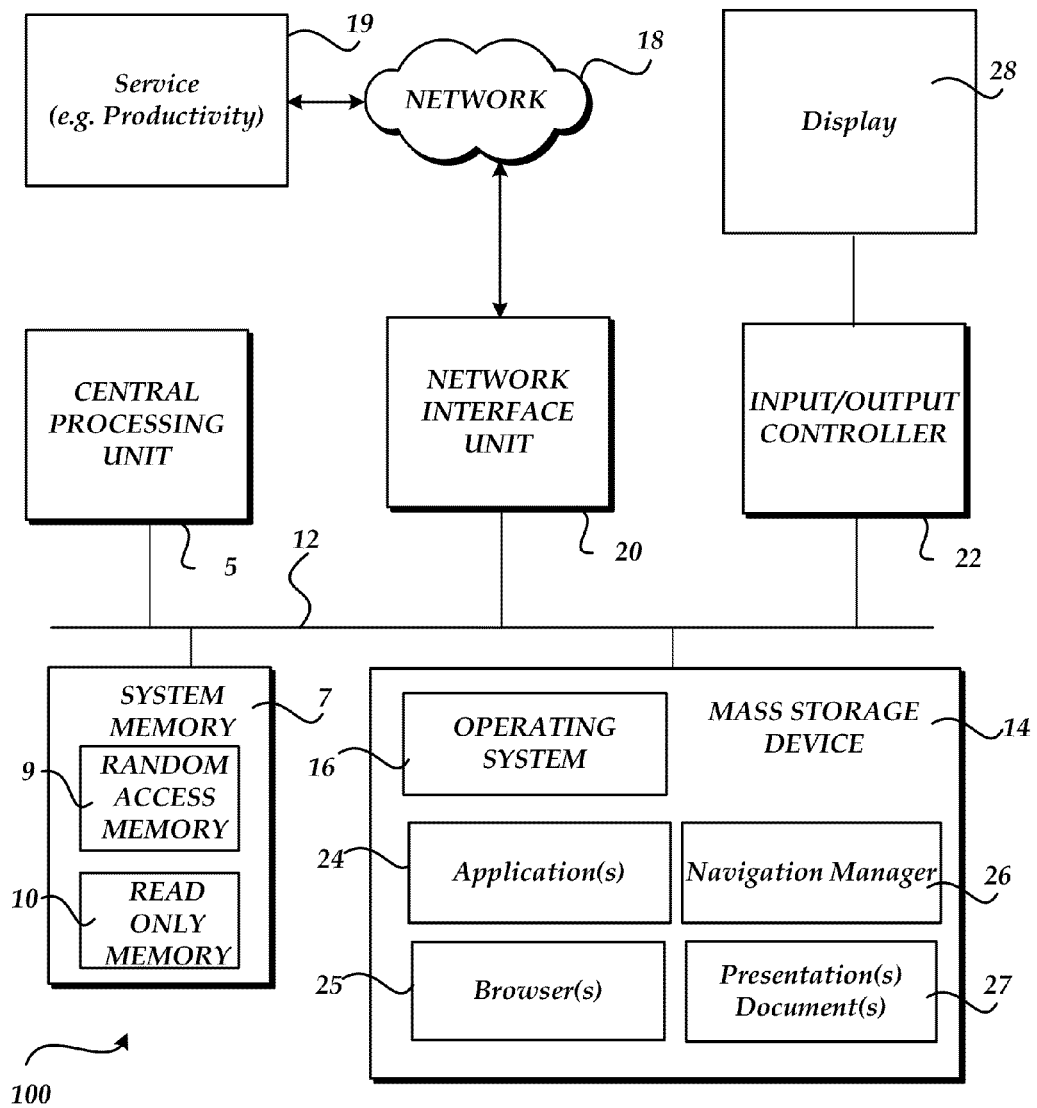
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . .) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, presentation(s)/document(s) 27, and other program modules, such as Web browser 25, and navigation manager 26, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computer 100 on the single integrated circuit (chip).

As mentioned briefly above, a number of program modules and data files may be stored in the mass storage device 14 and RAM 9 of the computer 100, including an operating system 16 suitable for controlling the operation of a networked computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications, such as a navigation manager 26, productivity applications 24 (e.g. a spreadsheet application such as MICROSOFT EXCEL, a presentation application such as MICROSOFT POWERPOINT, a word-processing application such as MICROSOFT WORD, a messaging application such as MICROSOFT OUTLOOK, and the like), and may store one or more Web browsers 25. The Web browser 25 is operative to request, receive, render, and provide interactivity with electronic content, such as Web pages, videos, documents, and the like. According to an embodiment, the Web browser comprises the INTERNET EXPLORER Web browser application program from MICROSOFT CORPORATION.

Navigation manager 26 may be located on a client device and/or on a server device (e.g. within service 19). Navigation manager 26 may be configured as an application/process and/or as part of a cloud based multi-tenant service that provides resources (e.g. services, data . . .) to different tenants (e.g. MICROSOFT OFFICE 365, MICROSOFT WEB APPS, MICROSOFT SHAREPOINT ONLINE).

Generally, navigation manager 26 is configured to display a navigable view of objects (e.g. charts, tables, graphs, data sources, individual sheets of a workbook, . . .) that are obtained from one or more electronic object sources are displayed as graphical objects (e.g. thumbnails). Some objects that are included within the navigable display may come from the different sheets of a spreadsheet workbook, other objects may come from another spreadsheet workbook, and yet other objects shown in the navigable display may come from other object sources (e.g. spreadsheets, web pages, documents, and the like). The objects may be automatically/manually organized within the navigable display (e.g. by type, by sheet, by relationship, by data source, . . .). A user may navigate through the displayed objects. For example, a user may zoom in on an object to see a full screen version of the object. When zoomed in on an object, the navigable display may be panned (e.g. left, right, up or down) to see adjacent objects. From one object, the user may explore related elements using the same shared data (e.g. exploring a chart object also shows a data source element). A user may also perform supported operations on the objects (e.g. sort/filter/drill down/drill up) that affect a display of the related objects. Additional details regarding the operation of navigation manager 26 will be provided below.

Figure 2:
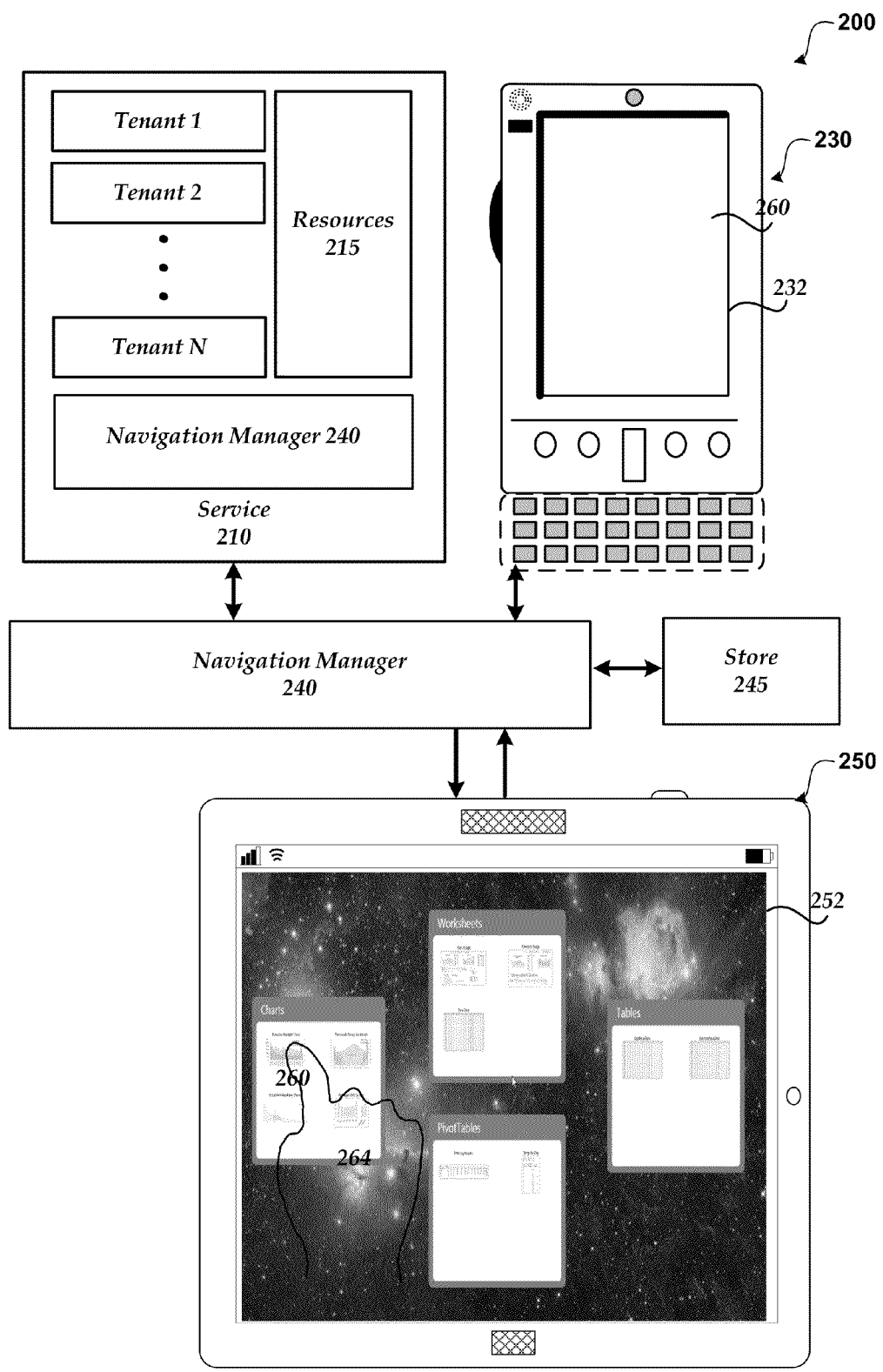
FIG. 2 illustrates an exemplary system for visually navigating a display of objects that are obtained from one or more electronic object sources.

FIG. 2 illustrates an exemplary system for visually navigating a display of objects that are obtained from one or more electronic object sources. As illustrated, system 200 includes service 210, navigation manager 240, store 245, touch screen input device/display 250 (e.g. slate) and smart phone 230.

As illustrated, service 210 is a cloud based and/or enterprise based service that may be configured to provide productivity services (e.g. MICROSOFT OFFICE 365, MICROSOFT WEB APPS, MICROSOFT POWERPOINT). Functionality of one or more of the services/applications provided by service 210 may also be configured as a client based application. For example, a client device may include a spreadsheet application that interacts with sheets storing objects within the grid of the sheet(s). Although system 200 shows a productivity service, other services/applications may be configured to virtually navigate objects that are obtained from one or more electronic object sources.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data.

System 200 as illustrated comprises a touch screen input device/display 250 (e.g. a slate/tablet device) and mobile phone 230 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

As illustrated, touch screen input device/display 250 shows an exemplary navigable display 252 of objects obtained from one or more electronic object sources (e.g. a spreadsheet document). As illustrated, navigable display 252 shows a display of objects (e.g. as thumbnails) that are obtained from a spreadsheet (e.g. one or more sheets of a spreadsheet from one or more workbooks) and organized by object type. Spreadsheet workbooks may include multiple objects on different pages. The objects may be any item in the workbooks that can be individually selected or manipulated. For example, the objects in workbook 300 may include tables, charts, PivotTables, PivotCharts, sheets of a spreadsheet workbook, data sources, and the like. According to an embodiment, objects may be obtained from other electronic object sources (e.g. web pages, databases, documents, data feeds, and the like). Some of the objects displayed in navigable display 252 may use data from a common data source. For example, a chart and a table may both use data from the same data source. According to an embodiment, an object may be defined to encompass multiple smaller objects. For example, an object may correspond to multiple sheets of a workbook. Each of the object sources may include multiple objects. The objects may be associated with static or dynamic information. Objects within the different object sources may be associated/related with one another. For example, an object from a first object source may be a different view of an object within a second object source. The object may also be a similar object to another. According to an embodiment, the object sources are configurable. For example, a user may use a user interface to select objects to create a navigable display from: a single spreadsheet, multiple spreadsheets, a single document, multiple document, and/or from other electronic object sources. An application (e.g. a spreadsheet application) may be configured to create a navigable display of spreadsheet objects that are associated with a current file a user is using.

Navigation manager 240 is configured to determine the electronic objects within the selected electronic object source(s) and then display the objects graphically (e.g. as thumbnails). The objects may be automatically/manually organized within the navigable display (e.g. by type, by sheet, by relationship, by data source, . . .). As illustrated, navigable display 252 arranges the objects by type (e.g. charts, worksheets, tables, and pivot tables). Navigable display 252 displays a top-level view to a user of each of the different type of objects that are contained within the selected electronic object sources. The user may interact with the navigable display 252 to navigate the different objects. For example, the navigable display 252 may be manipulated (e.g. zoomed, panned, . . .) to display one or more objects differently. For example, when a user selects an object, the view is updated to show a larger version of the object. A user may zoom in on an object to see a full screen version (or a different zoom level) of the object by selecting the object. In the current example, a user of a mobile device has zoomed in on a chart object 260 to get a better view of the object. When zoomed in on an object, the navigable display (e.g. display 232) may be panned (e.g. left, right, up or down) to see adjacent objects. From an object, the user may explore related elements using the same shared data (e.g. exploring a table object also shows a data source element). A user may also perform supported operations on the objects (e.g. sort/filter/drill down/drill up) that affect a display of the related objects. For example, a user may select chart 260 to interact with the chart and/or to drill down in the chart to see the associated data source(s) from which the chart is created. According to an embodiment, the navigable display shows relationships between different objects by showing a line between them. The navigable display may also display the elements by relationships. For example, the navigable display may be arranged by use of data sources (e.g. objects using a first data source grouped together, objects using a second data source grouped together, . . .).

A user may manually configure the layout of the objects. For example, a user may select the objects to show together within the navigable display. In this way, a user may navigate a workbook in their own way and not be constricted by how the workbook was originally authored.

Figure 3:
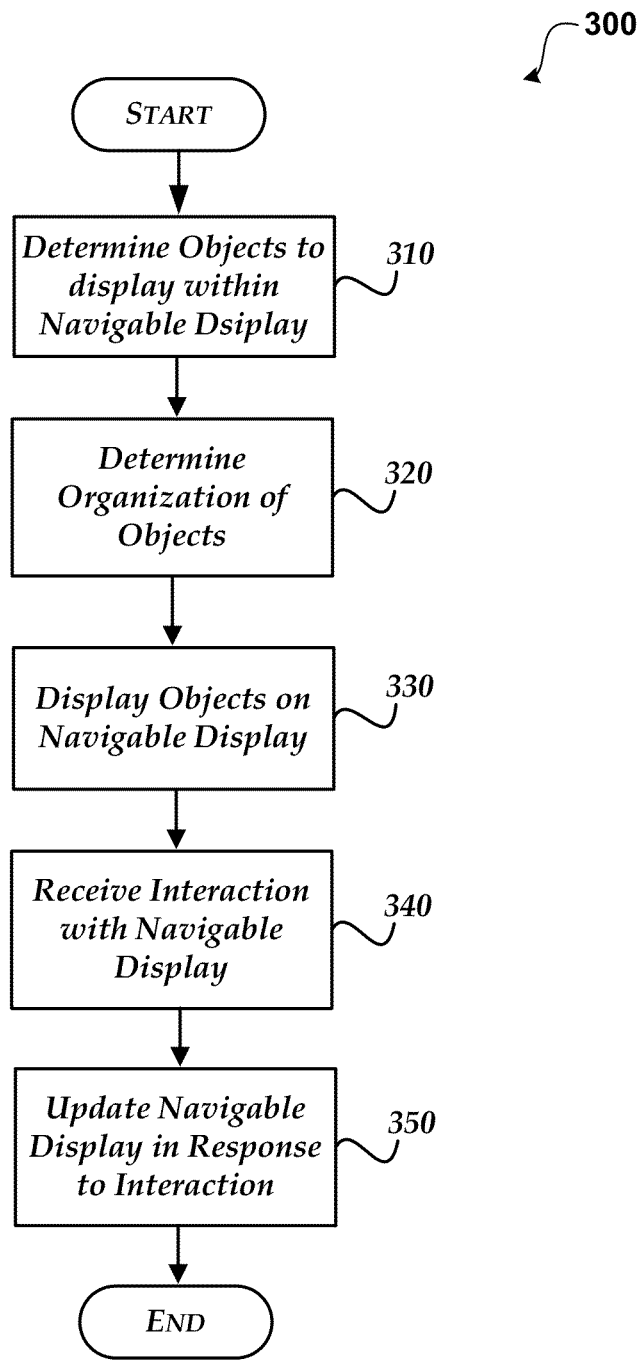
FIG. 3 shows a process for creating and interacting with a navigable display of objects.
Figure 4:
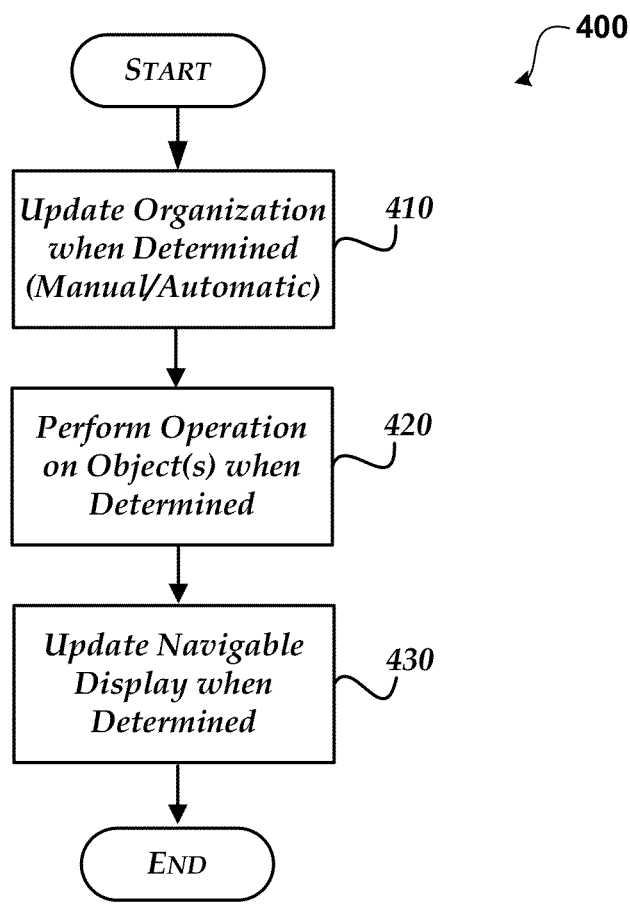
FIG. 4 illustrates a process for updating a navigable display of objects.

FIGS. 3-4 show an illustrative process for creating and interacting with a navigable display of objects. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

FIG. 3 shows a process for creating and interacting with a navigable display of objects.

After a start operation, the process flows to operation 310, where the objects to include within the navigable display are determined from one or more electronic object sources. According to an embodiment, the objects are obtained from one or more spreadsheet workbooks. The objects may also be obtained from other electronic object sources (e.g. web pages, databases, documents, data feeds, and the like). The objects that are included within the navigable display may be any item in the electronic object source that is defined as an object (e.g. tables, charts, PivotTables, PivotCharts, sheets of a spreadsheet workbook, data sources and the like).

Moving to operation 320, the organization of the objects is determined The organization may be determined automatically/manually and may be updated during the interaction with the navigable display. For example, the objects may be organized by: type of object; use of a common data source; from a same spreadsheet/workbook; and the like. A user may determine how a portion/all of the objects are organized. For example, the objects may first be automatically organized and then a user may selectively change the organization (e.g. move an object to another area within the navigable display).

Flowing to operation 330, the objects are displayed on the navigable display. According to an embodiment, each of the objects is displayed as a selectable thumbnail on a canvas that can be manipulated (e.g. moved, zoomed).

Transitioning to operation 340, an interaction is received that affects the navigable display. The interaction may be a variety of different interactions, such as, but not limited to: touch input, mouse input, stylus input, and the like. The interaction may include selecting an object, adjusting the display of the objects (e.g. zooming, panning), adjusting the organization of the elements, and the like. For example, a user may tap on an object within the display to zoom in on the object. A user may perform a panning gesture to pan the display of the navigable display, and the like. The interaction may include selection of one or more of the displayed objects and/or a manipulation of the navigable display to generate a different view (e.g. panning/zooming) For example, a user may zoom in on an object. A user may then drill down into the object to see the data source(s) associated with the object. During the interaction, a user may change data that affects a display of the object (e.g. changing the raw data for a chart changes a display of the chart). A user may explore other elements from a top-level display of the objects and from a lower-level view of the objects. For example, a user may cycle through each of the objects manually and/or automatically (e.g. each object is displayed for a period of time until interrupted by a user). A user may also perform supported operations on the objects (e.g. sort/filter/search/drill down/drill up) that affect a display of the related objects.

Moving to operation 350, the navigable display is updated in response to the interaction (e.g. changing a view of one or more objects in the navigable display).

The process then moves to an end operation and returns to processing other actions.

FIG. 4 illustrates a process for updating a navigable display of objects.

After a start operation, the process 400 flows to operation 410, where the organization of the objects are updated when determined For example, an object may be deleted/added to an electronic object source. A user may change the organization of the objects. For example, a user may organize the objects by a relationship of the objects (e.g. sales, purchases, . . .), by a type of data, by a data source, and the like. In response to any change, the organization and the update of the navigable display is updated.

Moving to operation 420, any operations are performed on the object(s) when determined. For example, a user may edit a value within an object, select a different display option for the object (e.g. display a pie chart instead of a bar graph), drill down/out of the object, and the like.

Flowing to operation 430, the display of the navigable display is updated when determined For example, a user may pan the navigable display, zoom the navigable display, select another object to display, and the like.

The process then moves to an end operation and returns to processing other actions.

Figure 5:
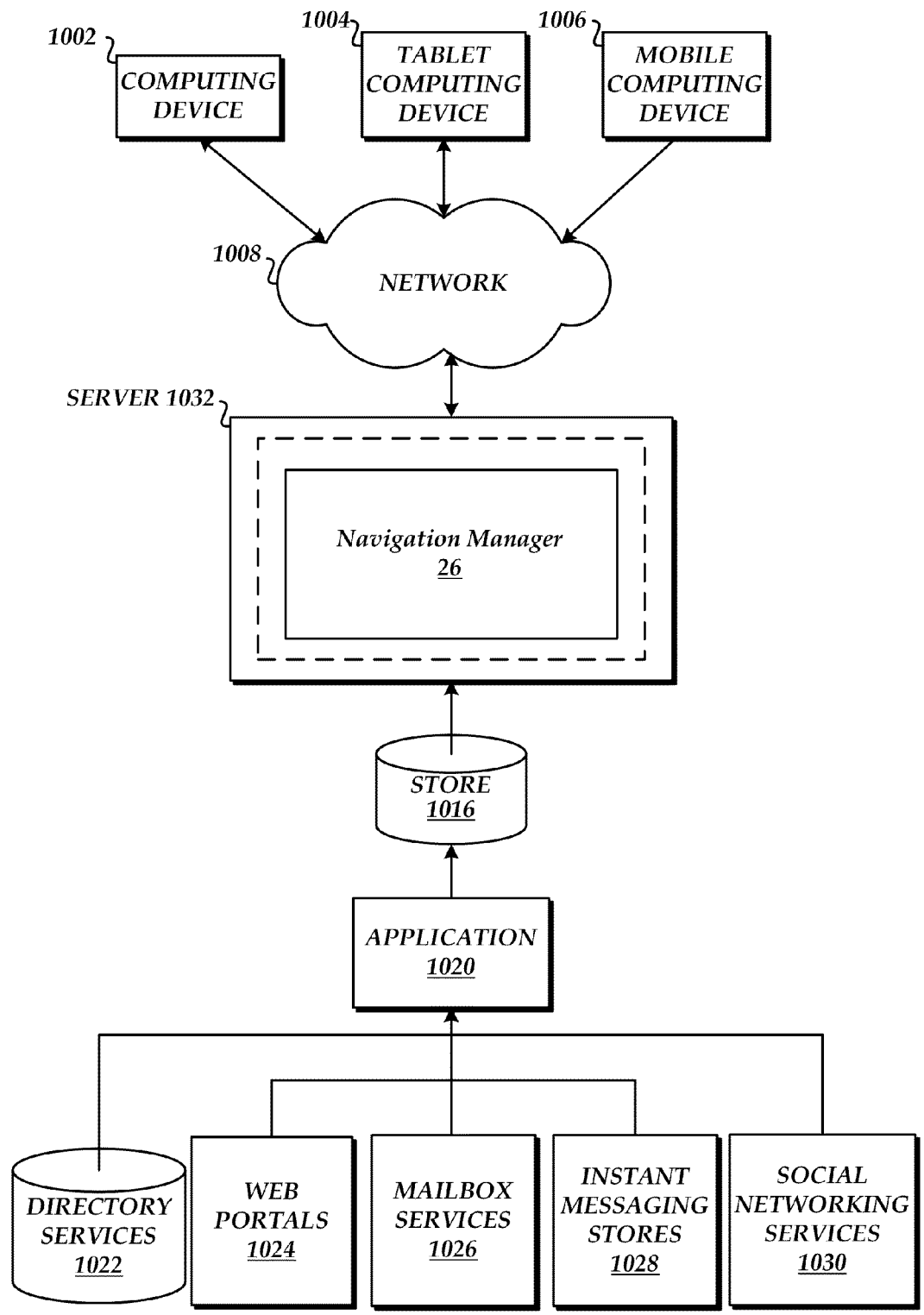
FIG. 5 illustrates a system architecture for creating and interacting with a navigable display of objects.

FIG. 5 illustrates a system architecture for creating and interacting with a navigable display of objects, as described herein. Content used and displayed by the application (e.g. application 1020) and the navigation manager 26 may be stored at different locations. For example, application 1020 may use/store data using directory services 1022, web portals 1024, mailbox services 1026, instant messaging stores 1028 and social networking sites 1030. The application 1020 may use any of these types of systems or the like. A server 1032 may be used to access electronic object sources and to generate a navigable display of objects. For example, server 1032 may generate navigable displays for application 1020 to display at a client (e.g. a browser or some other window). As one example, server 1032 may be a web server configured to provide productivity services (e.g. spreadsheet, presentation, word-processing, messaging, document collaboration, and the like) to one or more users. Server 1032 may use the web to interact with clients through a network 1008. Server 1032 may also comprise an application program (e.g. a spreadsheet application). Examples of clients that may interact with server 1032 and a presentation application include computing device 1002, which may include any general purpose personal computer, a tablet computing device 1004 and/or mobile computing device 1006 which may include smart phones. Any of these devices may obtain content from the store 1016.

FIGS. 6-15 show exemplary displays illustrating visually navigating objects. The examples shown herein are for illustration purposes and not intended to be limiting. While the objects illustrated in FIGS. 6-15 are obtained from spreadsheets, the electronic objects may be obtained from other electronic object sources.

Figure 6:
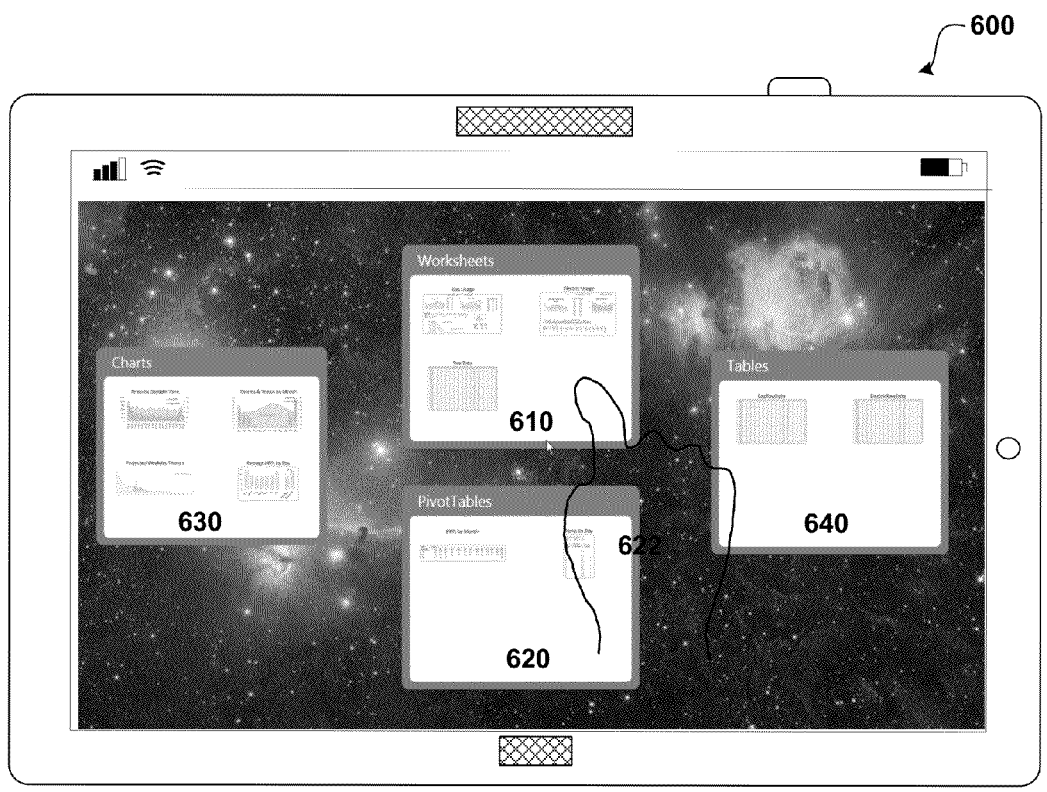
FIGS. 6-15 show exemplary displays illustrating visually navigating objects.

FIG. 6 shows an exemplary landscape slate display showing a top-level view of objects in a navigable display.

Display 600 shows an exemplary top-level view of objects within a spreadsheet. As illustrated, the objects within the navigable display are organized by worksheets 610 within a spreadsheet workbook, PivotTables 620 within the spreadsheet workbook, charts 630 within the spreadsheet workbook, and tables within the spreadsheet workbook. Viewing the top-level navigable display, a user may easily see the objects that are contained within the selected electronic object source(s) (e.g. a spreadsheet).

In the current example, a user 622 is selecting the display of worksheets 610 on the navigable display.

Figure 7:
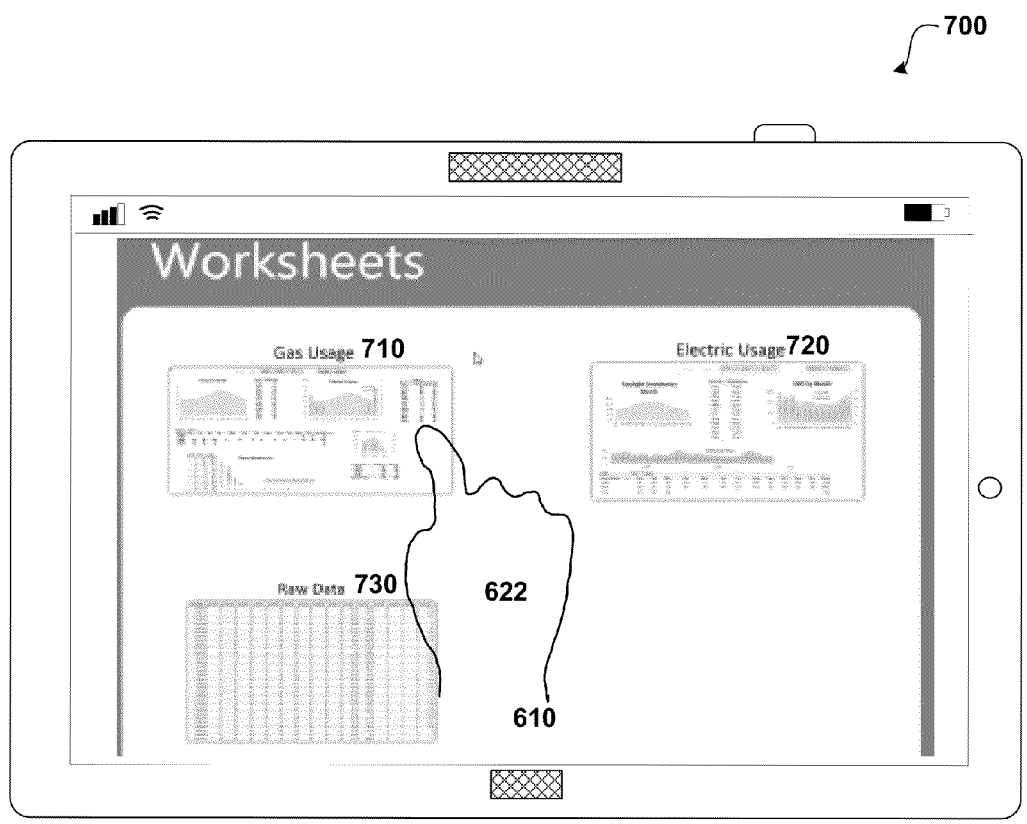

FIG. 7 shows an exemplary landscape slate display showing a selection of an organization classification from a top-level view of objects in a navigable display.

Display 700 shows a larger view of the objects that are included within the worksheets 610 of the navigable display. As illustrated, worksheets 610 includes a gas usage 710 object, an electric usage 720 object and data source object 730. The data source object may be associated with either/both of the gas usage 710 object and the electric usage 720 object.

In the current example, a user 622 is selecting the gas usage object 710 on the display of worksheets 610 for the navigable display.

Figure 8:
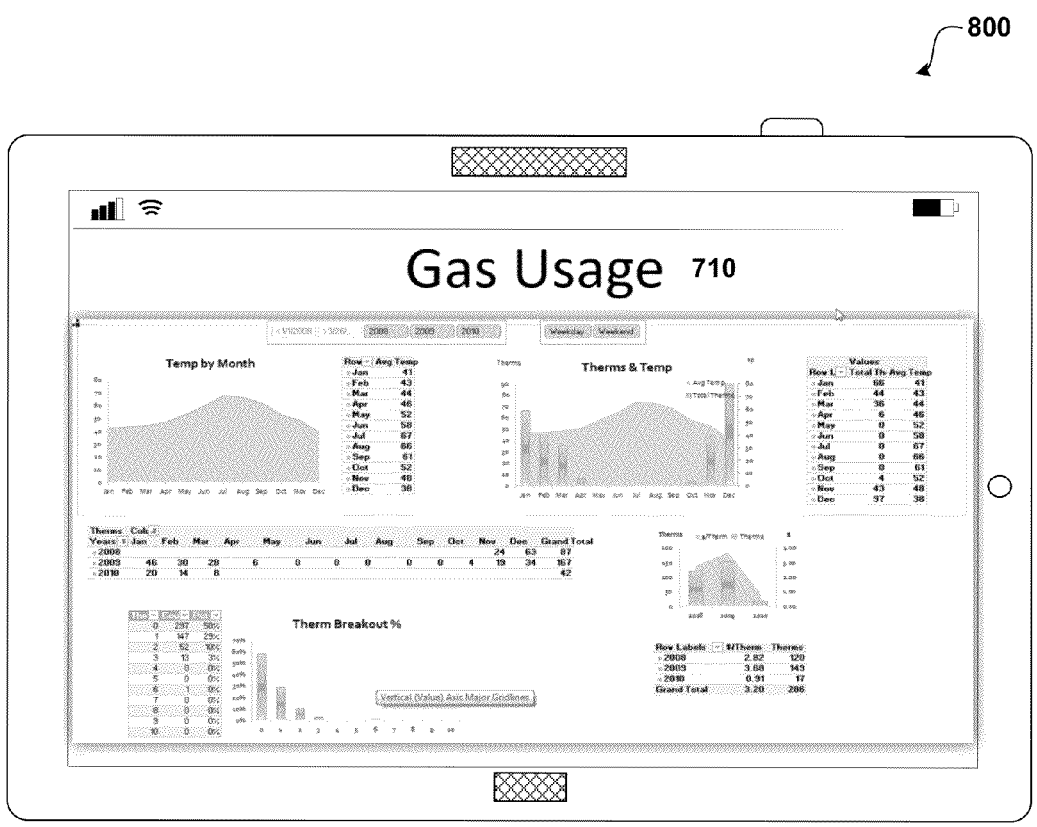

FIG. 8 shows an exemplary landscape slate display showing a selection of a single object from a navigable display.

Display 800 shows a larger view of the gas usage object 710 that is included within the worksheets 610 of the navigable display. A user may further drill down into the gas usage object 710 to display one or more data sources that are used by gas usage object 710. For example, selecting gas usage object 710 may display the associated data source object (e.g. See FIG. 10). The user may also interact with the gas usage object (change a view, filter data, edit data . . .).

According to an embodiment, a user may move between levels of the navigable display and/or move from one object to a next object. For example, a user may selecting to move to the electric usage object 720 from the display of the gas usage object 720 display and/or from the display of the worksheet display.

Figure 9:
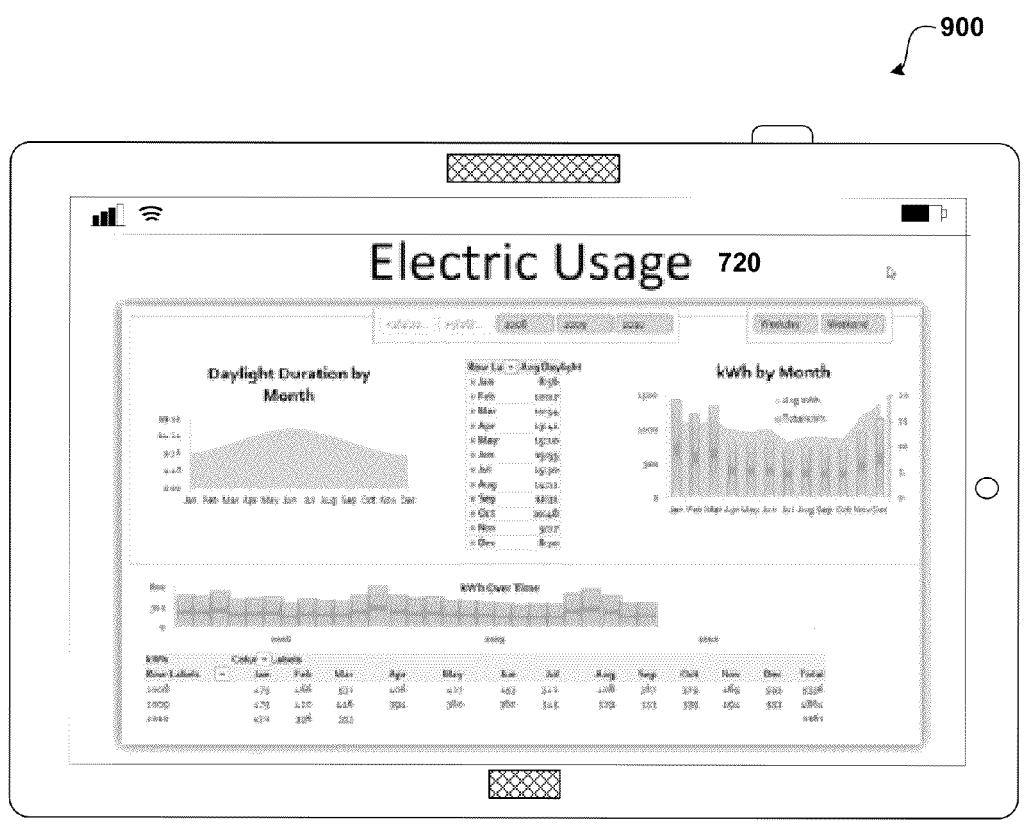

FIG. 9 shows an exemplary landscape slate display showing a selection of a single object from a navigable display.

Display 900 shows a larger view of the electric usage object 720 that is included within the worksheets 610 of the navigable display. A user may further drill down into the electric usage object 720 to display one or more data sources that are used by electric usage object 720. For example, selecting electric usage object 720 may display the associated data source object (e.g. See FIG. 10). The user may also interact with the electric usage object (change a view, filter data, edit data . . .).

Figure 10:
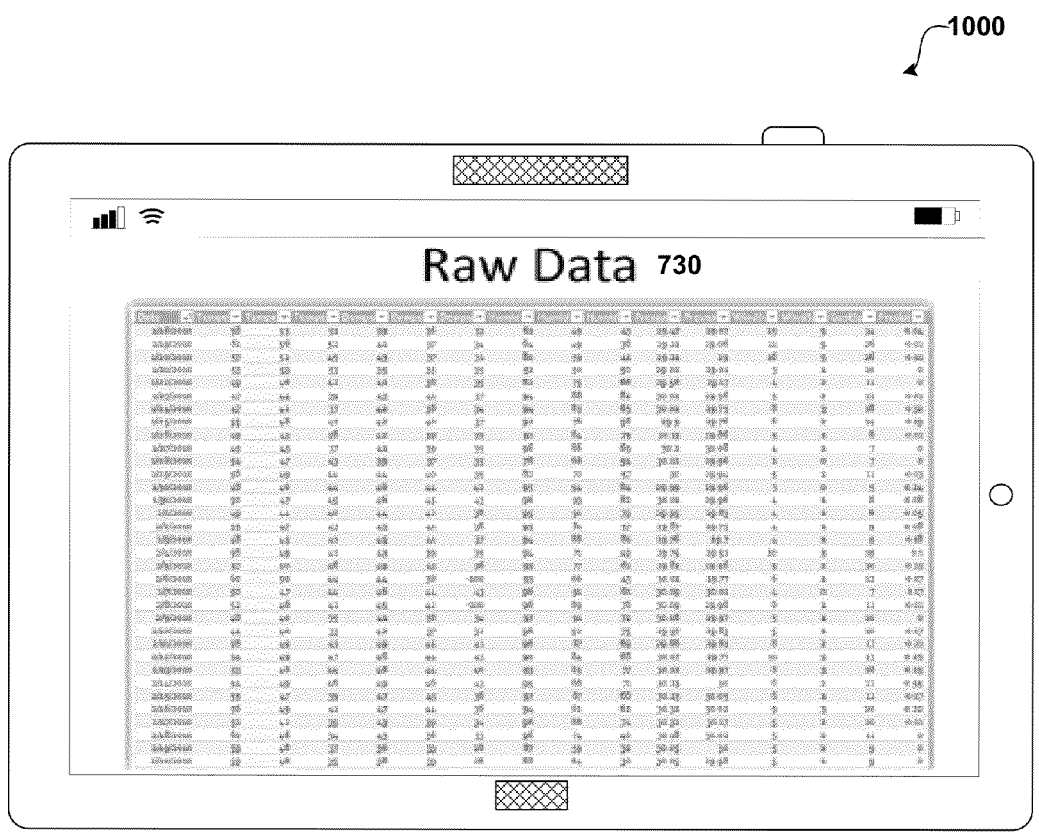

FIG. 10 shows an exemplary landscape slate display showing a data source object.

Display 1000 shows a larger view of the data source object 730 that is included within the worksheets 610 of the navigable display. The data source object 730 may be associated with one or more of the objects in the navigable display. A user may further drill down into the data source object 720 to display one or more data sources that are included within the data source object 730. The user may also interact with the data source object (change a view, filter data, edit data . . .).

Figure 11:
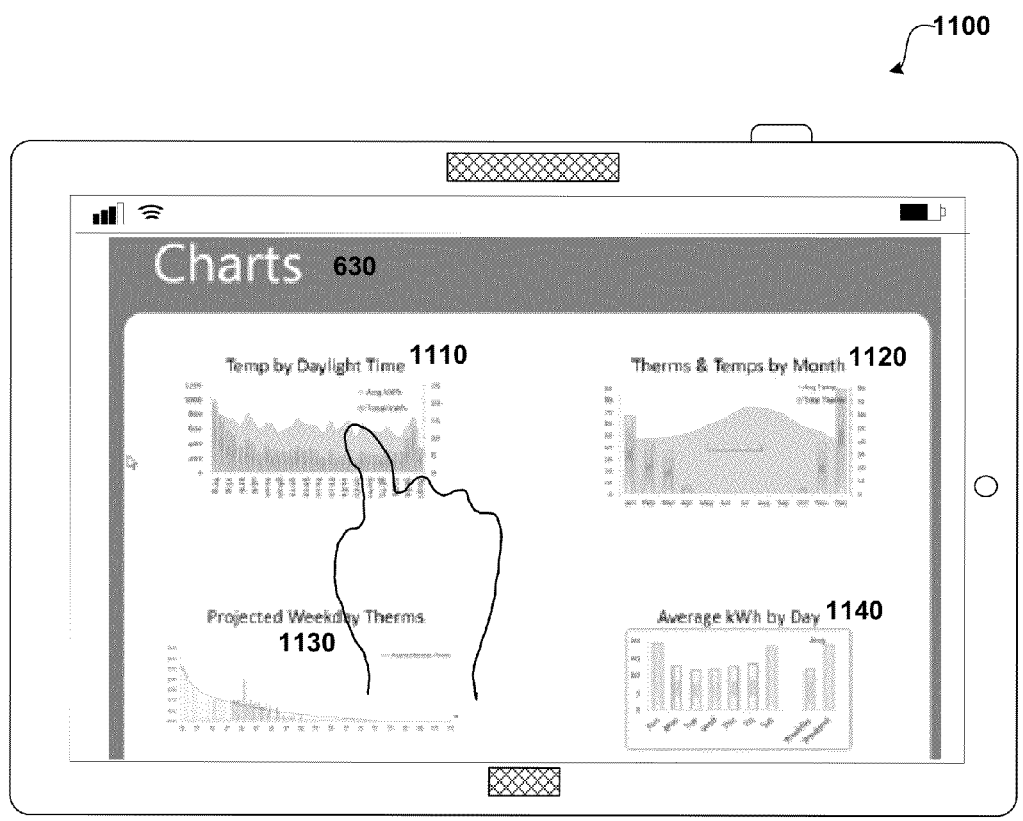

FIG. 11 shows an exemplary landscape slate display showing a selection of a charts classification from a top-level view of objects in a navigable display.

Display 1100 shows a larger view of the objects that are included within the charts 630 of the navigable display. As illustrated, charts 630 includes a temp by daylight time 1110 chart object, a therms and temps by month 1120 chart object, a projected weekday therms 1130 chart object and an average kWH by day 1140 chart object.

In the current example, a user 622 is selecting chart object 1110 on the display of worksheets 630 for the navigable display.

Figure 12:
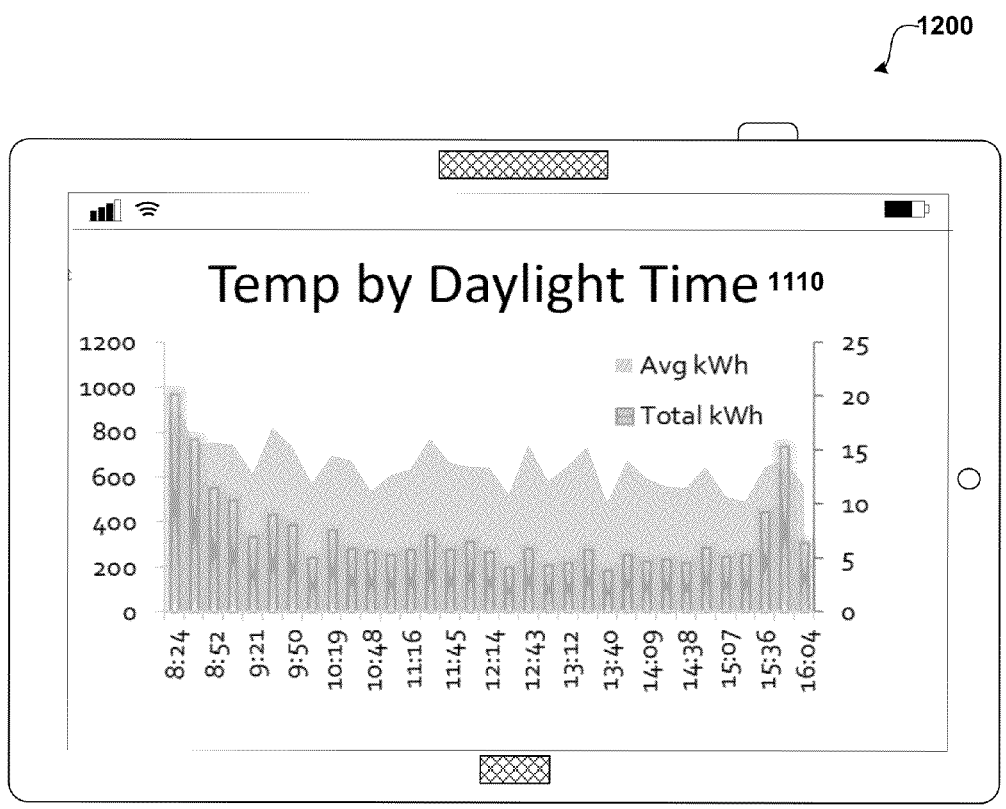

FIG. 12 shows an exemplary landscape slate display showing a selection of a single object from a navigable display.

Display 1200 shows a larger view of the temp by daylight time 1110 chart object that is included within the worksheets 630 of the navigable display. A user may further drill down into the chart object 1110 to display one or more data sources that are used by object 1110.

Figure 13:
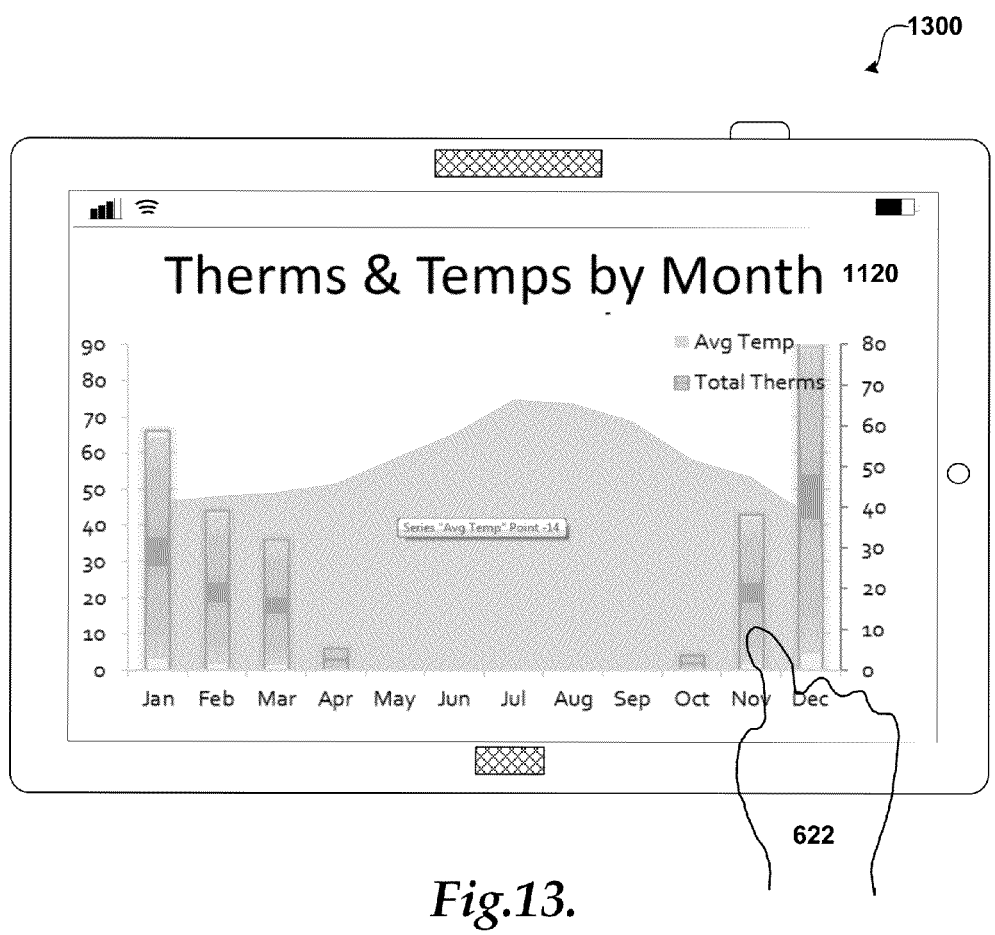

FIG. 13 shows an exemplary landscape slate display showing a selection of a single object from a navigable display.

Display 1300 shows a larger view of the Therms and Temps by Month 1120 chart object that is included within the worksheets 630 of the navigable display. A user may further drill down into the chart object 1120 to display one or more data sources that are used by object 1120. As illustrated, user 622 is selecting a bar within the chart object. According to an embodiment, the objects may be interacted with in the same manner as when they are included in the electronic object source from which they are obtained. For example, the objects include the same functionality when included within the navigable display.

Figure 14:
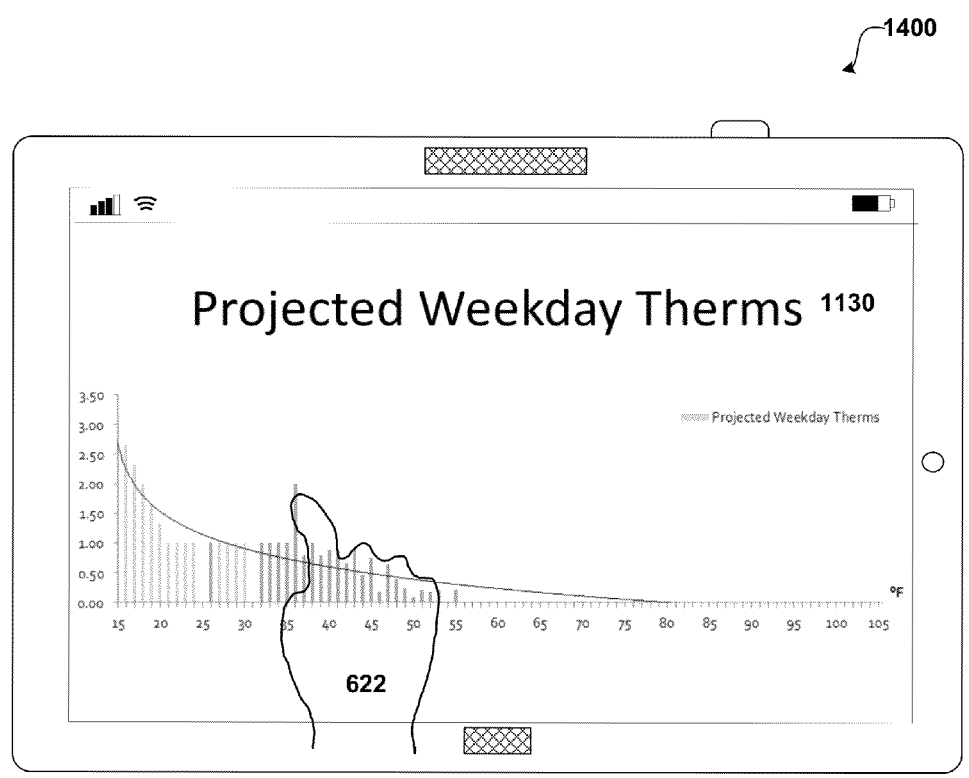

FIG. 14 shows an exemplary landscape slate display showing a selection of a single object from a navigable display.

Display 1400 shows a larger view of the Projected Weekday Therms 1130 chart object that is included within the worksheets 630 of the navigable display. A user may further drill down into the chart object 1130 to display one or more data sources that are used by object 1130. As illustrated, user 622 is selecting a bar within the chart object.

Figure 15:
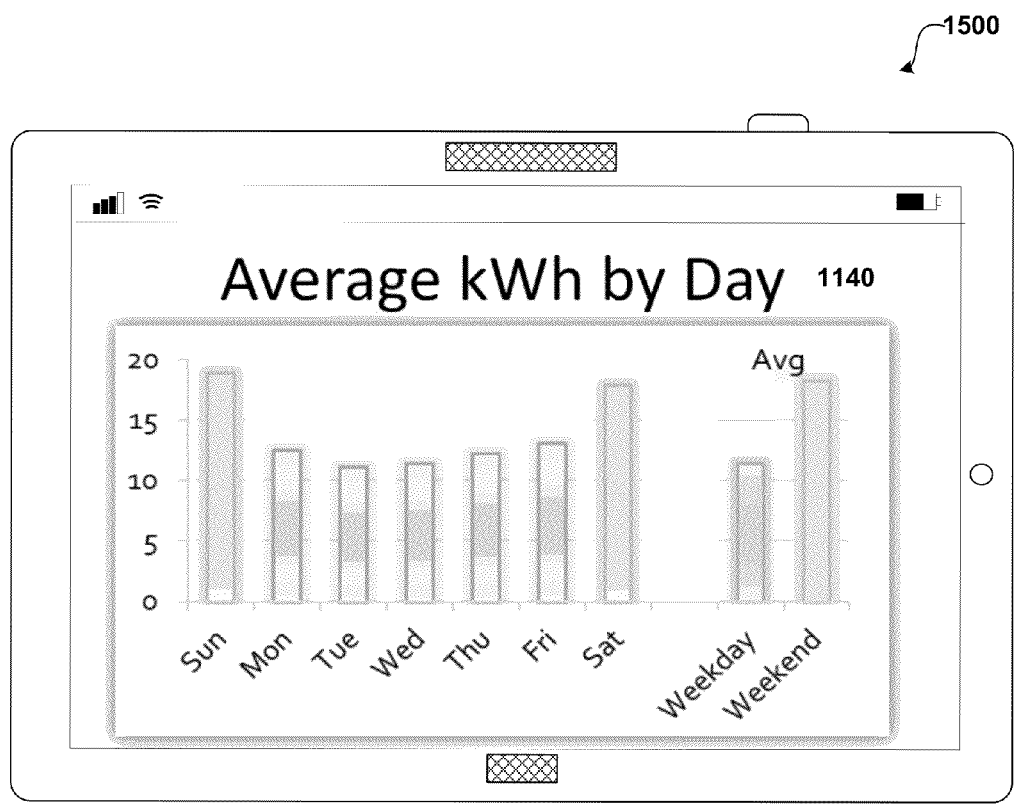

FIG. 15 shows an exemplary landscape slate display showing a selection of a single object from a navigable display.

Display 1500 shows a larger view of the Average kWh by Day 1140 chart object that is included within the worksheets 630 of the navigable display. A user may further drill down into the chart object 1140 to display one or more data sources that are used by object 1140.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for visually navigating objects, comprising:
   determining types of objects within a file wherein the file comprises other content;
   organizing each of the types of objects such that each of the types of objects comprises one or more of either a table, a chart or a spreadsheet, and wherein related objects are linked;
   displaying each of the objects as graphical objects on a navigable display according to a determined organization of the types of objects to navigate between the types of objects;
   receiving an interaction to drill down into one of the types of objects;
   in response to receiving an interaction to drill down into one of the types of objects, updating a view of the one type of objects;
   receiving an interaction to drill down into an object of one of either the table, chart or spreadsheet of the one type of objects with the updated view; and
   in response to receiving an interaction to drill down into the object of the one type of object with the updated view, replacing the updated view with one of either the table, chart or spreadsheet of the selected object on the navigable display.

2. The method of claim 1, wherein determining the types objects within the file comprises determining the type of objects that are contained within a spreadsheet file.

3. The method of claim 2, further comprising relating a data source object with at least a portion of the determined objects such that the related data source object is displayed in response to drilling down into the at least the portion of the determined objects.

4. The method of claim 1, wherein organizing each of the types objects comprises determining at least one of: an automatic organization of the types of objects and a manual organization of the types of objects.

5. The method of claim 1, wherein either of the steps of receiving the interaction comprises determining when the interaction is at least one of: a sort operation, a filter operation, a drill down operation, or-a drill up operation.

6. The method of claim 1, wherein either of the steps of receiving the interaction comprises automatically zooming in to display the object.

7. The method of claim 1, wherein either of the steps of receiving the interaction comprises updating any other objects that are affected in response to the received interaction.

8. The method of claim 1, wherein either of the steps of receiving an interaction comprises determining when the indication is an update to the navigable display that includes at least one of: panning the navigable display to show another object and changing a zoom of the navigable display.

9. A computer-readable medium having computer-executable instructions for visually navigating objects, comprising:
   determining objects from an electronic object source that comprise two or more of the following types of defined objects: a table object, a chart object, a spreadsheet object, a graph object, or a data source object that includes data, wherein the electronic object source comprises other content;
   automatically organizing the objects by type;
   displaying the objects organized by type on a navigable display according to the organization to navigate between the types of objects;
   receiving an interaction to drill down into one of the types of objects;

in response to receiving an interaction to drill down into one of the types of objects, updating a view of the one type of objects;

receiving an interaction to drill down into an object of one of either the table, chart or spreadsheet of the one type of objects with the updated view; and in response to receiving an interaction to drill down into the object of the one type of object with the updated view, replacing the updated view with one of either the table, chart or spreadsheet of the selected object on the navigable display.

10. The computer-readable medium of claim 9, wherein determining the types of objects within the electronic object source comprises determining the types of objects that are contained within a spreadsheet file.

11. The computer-readable medium of claim 10, further comprising for each object determining when the object uses data from a data source object and displaying the data source object within the navigable display.

12. The computer-readable medium of claim 9, wherein automatically organizing the objects comprises automatically organizing the objects according to a type of each of the objects.

13. The computer-readable medium of claim 9, further comprising receiving a manual organization of the objects.

14. The computer-readable medium of claim 9, wherein either of the steps of receiving the interaction comprises determining when the interaction is at least one of: a sort operation, a filter operation, a drill down operation, or a drill up operation.

15. The computer-readable medium of claim 9, wherein either of the steps of receiving the interaction comprises determining when the indication is an update to the navigable display that includes at least one of: panning the navigable display to show another object and changing a zoom of the navigable display.

16. A system for visually navigating objects, comprising:
a display;
a network connection that is coupled to tenants of the multi-tenant service;
a processor and a computer-readable medium;
an operating environment stored on the computer-readable medium and executing on the processor;
a process operating under the control of the operating environment and operative to perform actions, comprising:
determining objects from an electronic object source that comprise two or more of the following types of defined objects: a table object, a chart object, a spreadsheet object, a graph object, or a data source object that includes data, wherein the electronic object source comprises other content;
automatically organizing the objects by type;
displaying the objects organized by type on a navigable display according to the organization to navigate between the types of objects;
receiving an interaction to drill down into one of the types of objects;
in response to receiving an interaction to drill down into one of the types of objects, updating a view of the one type of objects;
receiving an interaction to drill down into an object of one of either the table, chart or spreadsheet of the one type of objects with the updated view; and
in response to receiving an interaction to drill down into the object of the one type of object with the updated view, replacing the updated view with one of either the table, chart or spreadsheet of the selected object on the navigable display.

17. The system of claim 16, further comprising for each object determining when the object uses data from a data source object and displaying the data source object within the navigable display.

18. The system of claim 16, wherein either of the steps of receiving the interaction comprises determining when the interaction is at least one of: a sort operation, a filter operation, a drill down operation, or a drill up operation.

19. The system of claim 16, wherein either of the steps of receiving the interaction comprises determining when the indication is an update to the navigable display that includes at least one of: panning the navigable display to show another object and changing a zoom of the navigable display.

* * * * *